Patented Jan. 9, 1934

1,942,431

UNITED STATES PATENT OFFICE

1,942,431

REFRACTORY BRICK AND PROCESS OF MAKING

Philip H. Jung, Huntingdon, Pa., assignor of one-half to Thomas N. Kurtz, Mount Union, Pa.

No Drawing. Application November 18, 1931
Serial No. 575,957

7 Claims. (Cl. 25—156)

This invention relates to refractory brick, commonly known as "firebrick", and has for its object to provide a brick which, while impervious and neutral to basic reactions in metallurgical operations, as, for example, that of basic slags, will, nevertheless, absorb certain objectionable elements frequently developed during metallurgical treatments, among which may be noted sulphur and phosphorus. Another characteristic of the brick made in accordance with my invention is that it is non-acid in character; has high tenacity; resistance to extreme temperatures, and presents unusual density. Furthermore, bricks made in accordance with my invention and following the process and mix of materials which I have developed, retain to a satisfactory degree their final form and, when subjected to the high temperatures of furnaces in which they are used, do not shrink or distort to any appreciable extent.

My invention comprises (1) the process of making refractory brick; (2) the mix or composition of which the bricks are made, and (3) the article.

I have discovered that if raw material, high in alumina ($Al_2O_3$) such, for example, as bauxite or diaspore clay, be thoroughly calcined at high temperatures, an inert and practically infusible product results, which product, disintegrated and mixed with a suitable colloidal mineral, such, for example, as colloidal fire clay or fire clay having optimum amount of colloids, and the mixture be thoroughly ground, admixed, molded, dried, and burned, following the usual mechanical methods of making firebrick, an article is produced in which the basic reaction is very marked, and all of the usual attributes to properties of high alumina firebrick are preserved.

In order that shrinkage may be eliminated or reduced, a small percentage of a shrinkage agent, such as lime or magnesia, in finely ground form, is desirable, and the shrinkage of the mass is thereby very materially reduced and any difficulties met in attempts to shrink the material in the pre-calcination process overcome, resulting in a dense, tenacious brick, which, when finished, has high refractory qualities and is capable of sustaining its load under very high temperatures without any perceptible shrinkage.

I have discovered that the results obtained can be best brought about by providing a compound or mix in which the silica content is as low as is practical in the carrying out of actual preparation of materials and in production of the finished product, and this elimination or reduction of the silica element must be observed, both in the selection and also in the preparation of the raw materials used, including the bonding and the shrinking agents. Unless this is observed, the resistance to basic reactions in metallurgical work will not be as satisfactory and results will be inferior.

While the formula which I have developed and which I will now set forth gives satisfactory results, it is to be understood that within reasonable limits, the percentages of material given may be varied and still be within the range of my invention, and it will be understood further that when, in setting forth my invention, I specify certain raw materials which are preferable, materials which have equivalent or substantially the same properties may be used in place of those specifically named.

In carrying out the process of making the batch of which the mix, and afterwards the bricks, are to be formed, I take raw material of high grade in an amount substantially 95% of the complete batch, which should have at least an alumina ($Al_2O_3$) content of 80%, bauxite ore or diaspore fire clay which exhibit substantially this percentage of alumina content being satisfactory. This raw material should be calcined following the usual methods, at relatively high temperatures, a temperature of 2700° F.–2800° F. having been found to give proper pre-calcination. This calcining step gives a resulting product which is inert and practically infusible at high temperatures. This calcined high alumina material should then be thoroughly mixed with substantially 3% to 5% of a ground colloidal mineral, such as, for example, colloidal fire clay or fire clay composed largely of colloids, for I have found that by using a relatively small percentage of colloidal mineral, a brick having superior characteristics and all the essential properties of an ordinary firebrick made with a large percentage of fire clay is produced and which is equal in basicity of reaction to any well known basic firebrick, such as magnesite or dolomite. A high colloidal condition of the fire clay bond can, if necessary, be brought about by subjecting the raw (clay) material in solution with washing water to electrolytic action which will separate out and cause sedimentation of those elements which are detrimental to a colloidal condition, leaving in suspension the clay content, which may be brought to usable condition in a practically true colloidal state. Again, by ammonia or equivalent treatment, sand or silica elements may be thrown down without depositing the clay content having the solution in condition for final extraction of the colloidal clay.

The thoroughly mixed composition that is of the high alumina material and the colloidal bond can then be molded into shapes desired, dried in the usual manner, and then burned; following the ordinary methods of burning refractory brick now known to the art and which need not be described in detail.

It has been found that sometimes difficulty exists in bringing about proper shrinkage of the high alumina material during the calcining step, and in order to overcome this and guard against undesirable shrinkage taking place during the final drying and burning of the brick, it is preferable to combine with the high alumina raw material, a small amount of a shrinkage agent, lime or magnesia being examples of suitable shrinkage agents, ground very finely and thoroughly mixed and commingled in the mass. I have found that from 3% to 5% of this shrinkage agent mixed with the alumina and then calcined will be sufficient to give satisfactory results in most cases, and when the final mix is made by the introduction of the colloidal fire clay, a compound is provided, which, when dried, and burned, gives a thoroughly preshrunk article characterized by the absence of any appreciable voids so that a density greater than the high alumina products heretofore made is secured and a brick provided which has the advantages of withstanding the action of slags or other corrosive elements and which will hold up under high temperature and load without any appreciable changes.

It will be understood that I use a colloidal bond in such small proportions relative to the mass that the presence of the silica will not be detrimental to the production of a brick which will be thoroughly resistant to reaction with basic slag.

While I have mentioned as one example a colloidal fire clay, it will be understood that there are various types of colloids which may be substituted therefor, such as commercial products known as "high aluminum colloids", as well as such natural products as "bentonite". These latter may be used in relatively small quantities with excellent results.

While I have referred above to colloidal fire clay broadly, it will be understood that there are numerous types of such commercial fire clays having optimum colloidal content.

As stated, I have found that colloidal fire clay constitutes a satisfactory, and, I believe, the best bonding material, although hydrated lime, raw bauxite ore, or raw bauxite and sodium silicate can be used with good results, but all or any of these should, as in the use of the colloidal fire clay, be in small percentages and only in sufficient amount to properly bond the materials and bring about the desired tenacity of the brick.

As pointed out, it is absolutely essential that the silica content of the finished product be as low as practical, in order to insure the basicity of such product, and to this end neutral or basic bonding material is utilized. If a bonding material having an acid element is employed, it should be used only in small quantity, so that the high alumina and low silica characteristics of the product will not be disturbed.

My invention contemplates the use of a high alumina material as the major ingredient of the mass and the use of a colloidal bond which may be used in such small quantities that the final product will possess a minimum of silica relative to the high alumina major mass and hence its presence will be negligible in that the product will be resistant at all times to basic reactions.

I claim:—

1. The new and improved process of making firebrick which comprises calcining at high temperatures raw material having high alumina and low silica contents, bonding the calcined product with a mineral material of colloidal character substantially free from or low in silica content, molding the final mixture to the desired form, and drying and burning the molded article.

2. The new and improved process of making firebrick which comprises calcining at high temperatures raw material having high alumina and low silica contents, thoroughly admixing with the calcined product a shrinkage agent, introducing into the mix mineral bonding material of colloidal character substantially free from or low in silica content, molding the final mixture to the desired form, and drying and burning the molded article.

3. The new and improved process of making firebrick which comprises calcining raw material having high alumina and low silica contents at temperatures which will give an inert product not susceptible to fusion at high temperature, thoroughly admixing with the calcined product a shrinkage agent substantially free from silica, introducing into the mix a mineral bonding material which is high in colloids and from which non-colloidal elements have been practically eliminated, molding the final mixture to the desired form, and drying and burning the molded article.

4. A new and improved composition suitable for the manufacture of firebrick comprising calcined material having a high alumina content and low in silica content, and a colloidal bonding material substantially free from silica.

5. A new and improved composition suitable for the manufacture of firebrick comprising calcined material having a high alumina content and low silica content, a mineral shrinkage agent, and a colloidal bonding mineral.

6. A new and improved composition suitable for the manufacture of firebrick comprising calcined material having a high alumina content, a mineral shrinkage agent, and a colloidal bonding mineral, said ingredients being substantially free from or low in silica content.

7. As a new article of manufacture, a firebrick comprising a calcined material having a high alumina content, of substantially inert and infusible character and substantially free from silica content, and a bonding material of highly colloidal nature and substantially free from silica content characterized by high density, tenacity and imperviousness to the action of basic slags.

PHILIP H. JUNG.